United States Patent
Bohrer et al.

(10) Patent No.: US 6,985,952 B2
(45) Date of Patent: Jan. 10, 2006

(54) ENERGY-INDUCED PROCESS MIGRATION

(75) Inventors: Patrick J. Bohrer, Austin, TX (US); Elmootazbellah N. Elnozahy, Austin, TX (US); Thomas W. Keller, Austin, TX (US); Michael D. Kistler, Pflugerville, TX (US); Freeman L. Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 10/001,742

(22) Filed: Oct. 31, 2001

(65) Prior Publication Data

US 2003/0084154 A1    May 1, 2003

(51) Int. Cl.
*G06F 15/16*    (2006.01)

(52) U.S. Cl. .............. 709/226; 709/201; 709/203; 709/218; 713/200

(58) Field of Classification Search ........... 713/310, 713/300, 200; 709/226, 213

See application file for complete search history.

(56) References Cited

U.S. PATENT DOCUMENTS

| 6,035,333 | A  | * | 3/2000 | Jeffries et al. ........... 709/224 |
| 6,085,328 | A  | * | 7/2000 | Klein et al. ............. 713/310 |
| 6,571,181 | B1 | * | 5/2003 | Rakshani et al. ......... 702/60 |
| 6,711,691 | B1 | * | 3/2004 | Howard et al. .......... 713/300 |

* cited by examiner

Primary Examiner—Rupal Dharia
Assistant Examiner—Djenane M. Bayard
(74) Attorney, Agent, or Firm—Richard F. Frankeny; Winstead Sechrest & Minick P.C.; David A. Mims, Jr.

(57) ABSTRACT

Cluster systems having central processor units (CPUs) with multiple processors (MPs) are configured as high density servers. Power density is managed within the cluster systems by assigning a utilization to persistent states and connections within the cluster systems. If a request to reduce overall power consumption within the cluster system is received, persistent states and connections are moved (migrated) within the multiple processors based on their utilization to balance power dissipation within the cluster systems. If persistent connections and states, that must be maintained have a low rate of reference, they may be maintained in processors that are set to a standby mode where memory states are maintained. In this way the requirement to maintain persistent connections and states does not interfere with an overall strategy of managing power within the cluster systems.

18 Claims, 2 Drawing Sheets

ENERGY-INDUCED PROCESS MIGRATION

TECHNICAL FIELD

The present invention relates in general to power management in cluster systems with persistent connections and states.

BACKGROUND INFORMATION

Clustering refers to using two or more systems that work together. It generally refers to multiple computer systems that are linked together in order to handle variable workloads or to provide continued operation in the event one system fails. Each computer may be a multiprocessor system itself. For example, a cluster of four computers, each with four central processing units (CPUs), would provide a total of 16 CPUs processing simultaneously. Another cluster system may include multiple server systems in a rack configuration where each server may have multiple processor circuit boards wherein each processor circuit board has multiple processors. These cluster systems often require substantial cabling for power and also provisions for cooling. For example, while all processors in the servers may be run for short times to handle processing requirements, the generated power density may require selected processors to be throttled or shut down or put in a low power mode to prevent thermal overloads. Cluster systems are becoming popular as a way of providing very high peak service for customers, therefore requiring methods to deal with the resulting power distribution problems. Strategies for managing power distribution problems in cluster systems encompass, varying performance of individual processors, partitioning cooling units, etc.

In a cluster of servers where power consumption is important, persistent connections and persistent states may defeat cluster-wide power management policies. A persistent connection is a required link between processors or programs within a cluster system or between the cluster system and external client systems which must be maintained to accomplish a task. A persistent state is a state of a processor or a program that must be remembered or maintained for an operation within the cluster system to insure that if the operation is suspended or interrupted for any reason, resumption of the operation will pick up with its resources intact. An example of persistent connections occurs frequently in the World Wide Web (WWW) when a customer performs a purchase over the Internet. The customer starts by authenticating with the server and then invokes several operations on the server's Web site to handle the purchase and payment. During the transaction, the customer's authorized credentials must be kept in a session data structure at the server. This data needs to persist while the transaction is in progress to ensure privacy and security.

Modern cluster systems used in large database systems (e.g., Internet) are being configured into super-dense cluster systems where many processors are placed on a single processor board and many such multiple processor (MP) boards are housed in racks. This may create very high power density concerns. Many strategies are being proposed to have dynamic power distribution management to deal with the high power densities of MP servers. Some of these techniques advocate shutting down some processors or machines if the aggregate workload may not use the entire processing capacity of the cluster. However, it may not be possible to shut down a machine or a processor within the cluster if there is an executing long-running task. Also, if there are persistent links between the machine and other machines or clients, or if there is a persistent state information that exists in volatile or stable memory that must be maintained on behalf of clients. Having limitations posed by the requirements of persistent connections and states thus greatly reduces the possibilities for power management strategies. There is, therefore, a need for method to eliminate limitations of persistent connections and states to facilitate power management in high density servers.

SUMMARY OF THE INVENTION

Long-running tasks with persistent states and connections within the cluster system, which execute on processors with a low activity, are migrated to more active processors to allow the inactive processors to be shut down to manage power. Persistent states and connections in processors that are to be put in standby are migrated to active processors if they have a predetermined activity level. Long-running tasks with persistent sates and connections, which are likely to go through long periods of inactivity, are maintained in processors in a standby mode that maintains memory states. Inactive processors may be either shut down or put into standby mode as an overall process of managing power distribution in the cluster system.

The foregoing has outlined rather broadly the features and technical advantages of the present invention in order that the detailed description of the invention that follows may be better understood. Additional features and advantages of the invention will be described hereinafter, which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
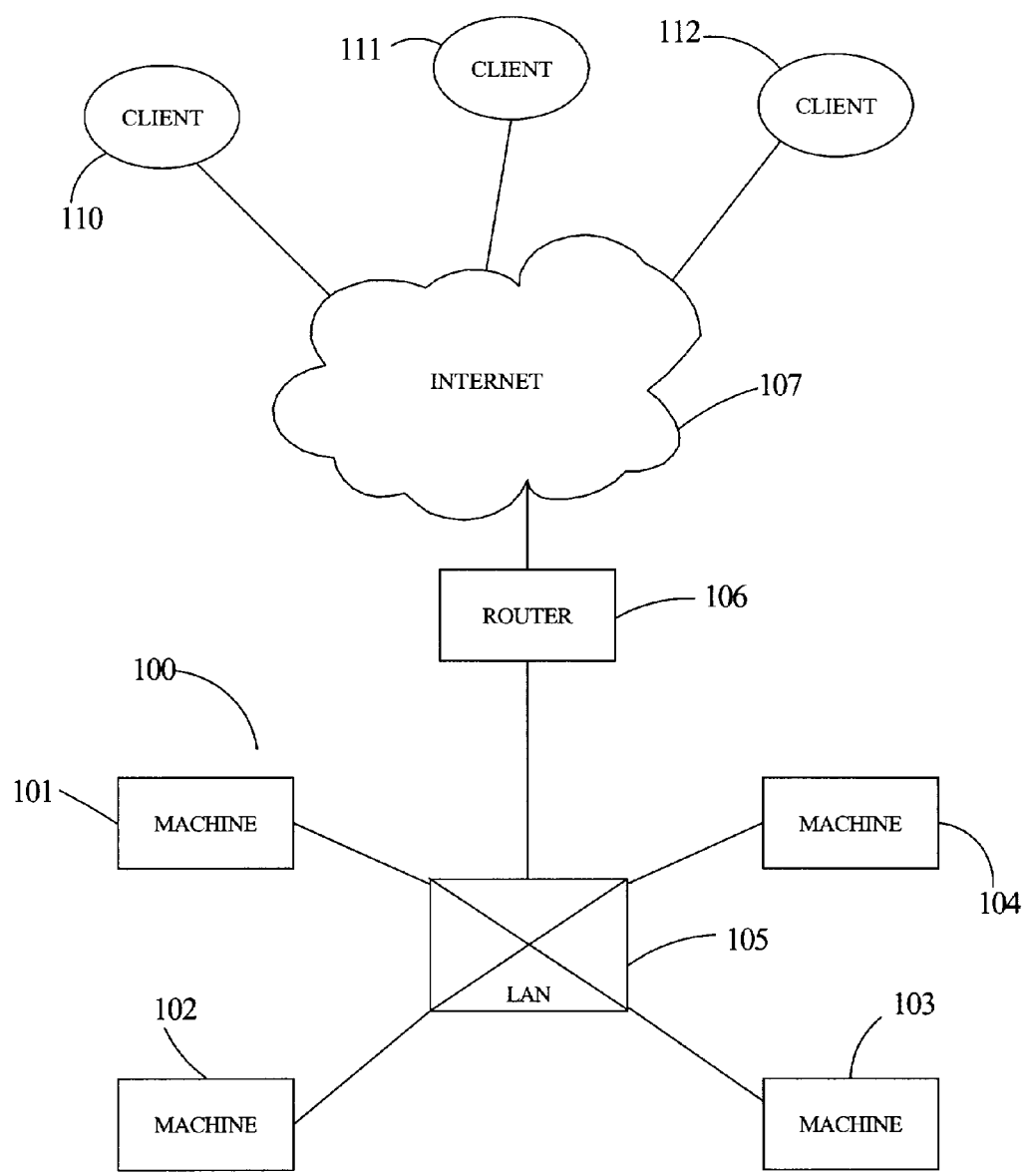
FIG. 1 is a block diagram of a cluster system operable to use embodiments of the present invention.

In the following description, numerous specific details are set forth to provide a thorough understanding of the present invention. However, it will be obvious to those skilled in the art that the present invention may be practiced without such specific details. In other instances, well-known concepts have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. In the following description, machines may be used interchangeably with processors or central processor units (CPU). A CPU may comprise one or multiple processors. A machine may comprise other circuits beside a processor or multiple processors where the processors are the main element being managed by embodiments of the present invention.

FIG. 1 is a high-level functional block diagram of a cluster system 100 suitable for practicing the principles of the present invention. Exemplary cluster system 100 comprises machines 101, 102, 103, and 104 that are connected via a local area network (LAN) 105. Machines 101, 102, 103, and 104 use the LAN 105 to communicate among themselves as well as to communicate with the rest of the network through router 106, which connects the LAN 105 to the Internet 107. Remote client systems 110, 111, and 112 communicate through the Internet 107 with the cluster system 100 to perform services and general computations. The exemplary client systems 110–112 may use a standard communication protocol such as the Transmission Control Protocol (TCP) of the Internet Protocol (IP) suite in the widely used combination of TCP/IP. The LAN 105 could be a general-purpose network such as Ethernet, Token Ring, Asynchronous Transfer Mode (ATM), or any technology used to implement local area networking. Alternatively, LAN 105 may be implemented by a switching protocol such as an optical switch, a memory bus, or a system bus interconnect such as Infiniband or Peripheral Component Interconnect Extended (PCI/X). The network configuration using cluster system 100 in FIG. 1 is an example system by way of illustration and is not meant as a limitation. Those versed in the art will appreciate that the current invention is applicable to systems that follow the spirit of the illustrated design, including multi-processors, uni-processors, non-uniform memory access machines (NUMA), and the like.

Figure 2:
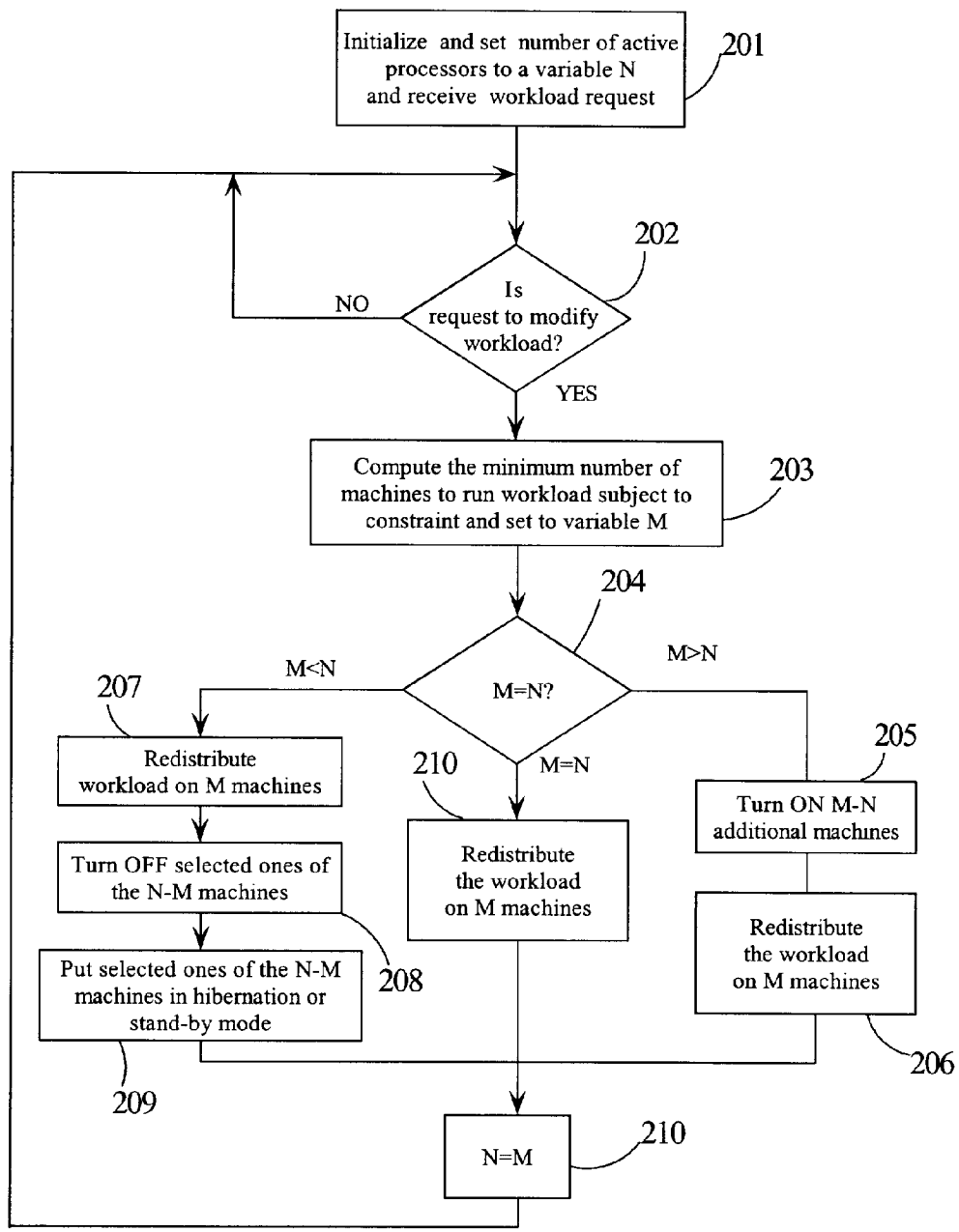
FIG. 2 is a flow diagram of the steps employed in managing power in processors where long-running tasks with persistent states and connections according to embodiments of the present invention.

FIG. 2 is a flow diagram of steps in embodiments of the present invention. In step 201, cluster system 100 may be initialized by bringing up one machine or a number of N machines may be executing. If a machine is being initialized, other operations needed to initialize the cluster system 100 are performed in this step (e.g., booting the necessary machines, identifying the machines (processors) available in the cluster system 100, etc.). In any case N machines are active in step 201. In step 202, a test is done to determine if there is a request to modify the workload by either adding new tasks or terminating existing ones. If the result of the test in step 202 is NO, then no action may be needed. On the other hand, if the result of the test in step 202 is YES, then in step 203 the minimum number of processors necessary to handle the new workload is computed. This minimum number of processors is assigned the variable number M. To derive the number M, the contribution of each executing task to the cluster system 100 workload is computed in step 203. For example, starting with a value for each task that represents its computational workload and resource needs, the minimum number of processors M that can handle the aggregate workload is computed. Those familiar with the state of the art may appreciate that this is an instance of the famous bin-packing problem, for which there are many efficient solutions. Step 203 may require that the various processors measure and report usage numbers for each task to a designated entity in the cluster system 100, such as one of the functioning processors (e.g, within machines 101–104).

In step 204, a determination is made whether additional processors are needed or whether it is possible to turn off processors. This is done by comparing the new minimum number of M processors to the existing number of N active processors. There are three cases to consider: In the first case, the number of M processors needed does not change from the existing number of N active processors. In this case, a branch is taken to step 210 where the workload is distributed in keeping with these M processors. It may also be desirable, in step 210, to minimize the reallocation of tasks among processors, in such a way to minimize the number of process and state migrations within processors in cluster system 100. The case where the workload is reduced is straightforward as the current allocation may remain unchanged. In the case where the workload increases, it may be necessary to migrate a few tasks to adjust to the new workload distribution. Those familiar with the art may appreciate that there are standard algorithms for performing this step.

In the second case, the number of M processors needed is greater than the number of N active processors. In this case, M–N additional machines (processors) are brought on-line in step 205. These machines may previously have been put in hibernation or stand-by mode to conserve energy. These machines are brought on line and the workload is distributed in step 206. Again, it may be desirable to minimize the reallocation of tasks among the M processors, in such a way to minimize the number of process and state migrations within processors in cluster system 100. Those familiar with the art may appreciate that there are standard algorithms for performing this step such as constraint-based bin packing. In the third case, the number of M required processors needed is less than the number of N active processors. This is the case that corresponds to a reduction in the workload. This case creates an opportunity to conserve energy. In step 207, M processors that will remain active are selected and the workload is redistribute across these M processors. As before, it may be desirable to use the same constraint-based bin packing solutions to minimize the number of process and state migrations within processors in cluster system 100. In step 208, selected ones of the not utilized N–M excess machines may be set to an off mode to conserve energy. In step 209, selected ones of the N–M processors may be put in hibernation or stand-by mode. In step 210, the variable N is set to the newly computed value M and a branch is taken back to step 201.

The workload distribution within cluster system 100 is optimized by process migration while maintaining persistent states and connections. Process migration is done under the criteria of minimizing the number of active processors and minimizing the number of process migrations since migrating processes and maintaining persistent states and connections may use considerable system resources.

Although the present invention and its advantages have been described in detail, it should be understood that various changes, substitutions and alterations can be made herein without departing from the spirit and scope of the invention as defined by the appended claims.

What is claimed is:

1. A method for managing workload distribution in a multiple processor cluster system to conserve energy, comprising the steps of: classifying persistent states and connections within said cluster system according to an activity referencing said persistent states and connections; receiving a request to modify a workload of said cluster system; determining a minimum number of processors in said cluster system for executing said modified workload while maintaining said persistent states and connections; determining a workload distribution within said minimum number of processors that satisfies said modified workload while maintaining said persistent states and connections; and modifying an operation mode of a selected processor in said processors of said cluster system to conserve energy while satisfying said modified workload while maintaining said persistent states and connections and migrating persistent states and connections within said cluster system to effect said workload distribution.

2. The method of claim 1, wherein said operation mode of said selected processor is modified by setting said selected processor to an off mode.

3. The method of claim 1, wherein said operation mode of said selected processor is modified by setting said selected processor to a stand-by mode.

4. The method of claim 1, wherein said operation mode of said selected processor is modified by setting said selected processor to an active full power mode from an off or a stand-by mode.

5. The method of claim 1, wherein said step of determining said workload distribution for said minimum number of processors uses a constraint based bin packing algorithm.

6. The method of claim 5, wherein a particular constraint of said bin packing algorithm comprises minimizing a number of processes and states migrated to effect said workload distribution.

7. A cluster system comprising multiple processor central processing unit (CPU)s having circuitry for classifying persistent states and connections within said cluster system according to an activity referencing said persistent states and connections, circuitry for receiving a request to modify a workload of said cluster system, circuitry for determining a minimum number of processors in said cluster system for executing said modified workload while maintaining said persistent states and connections, circuitry for determining a workload distribution within said minimum number of processors that satisfies said modified workload while maintaining said persistent states and connections, and circuitry for modifying an operation mode of a selected processor in said processors of said cluster system to conserve energy while satisfying said modified workload while maintaining said persistent states and connections; a random access memory (RAM); a communications adapter coupled to a communication network; and a bus system coupling said CPUs to said communications adapter and said RAM and wherein the cluster system further comprises migrating persistent states and connections within said cluster system to effect said workload distribution.

8. The cluster system of claim 7, wherein said operation mode of said selected processor is modified by setting said selected processor to an off mode.

9. The cluster system of claim 7, wherein said operation mode of said selected processor is modified by setting said selected processor to a stand-by mode.

10. The cluster system of claim 7, wherein said operation mode of said selected processor is modified by setting said selected processor to an active full power mode from an off or a stand-by mode.

11. The cluster system of claim 7, wherein said step of determining said workload distribution for said minimum number of processors uses a constraint based bin packing algorithm.

12. The cluster system of claim 11, wherein a particular constraint of said bin packing algorithm comprises minimizing a number of processes and states migrated to effect said workload distribution.

13. A computer program product for managing workload distribution in a multiple processor cluster system to conserve energy, said computer program product embodied in a machine readable medium for energy management in a computer system having a plurality of computation nodes, including programming for a processor, said computer program comprising a program of instructions for performing the program steps of: classifying persistent states and connections within said cluster system according to an activity referencing said persistent states and connections; receiving a request to modify a workload of said cluster system; determining a minimum number of processors in said cluster system for executing said modified workload while maintaining said persistent states and connections; determining a workload distribution within said minimum number of processors that satisfies said modified workload while maintaining said persistent states and connections; modifying an operation mode of a selected processor in said processors of said cluster system to conserve energy while satisfying said modified workload while maintaining said persistent states and connections and migrating persistent states and connections within said cluster system to effect said workload distribution.

14. The computer program product of claim 13, wherein said operation mode of said selected processor is modified by setting said selected processor to an off mode.

15. The computer program product of claim 13, wherein said operation mode of said selected processor is modified by setting said selected processor to a stand-by mode.

16. The computer program product of claim 13, wherein said operation mode of said selected processor is modified by setting said selected processor to an active full power mode from an off or a stand-by mode.

17. The computer program product of claim 13, wherein said step of determining said workload distribution for said minimum number of processors uses a constraint based bin packing algorithm.

18. The computer program product of claim 17, wherein a particular constraint of said bin packing algorithm comprises minimizing a number of processes and states migrated to effect said workload distribution.

* * * * *